United States Patent Office 3,035,424
Patented May 22, 1962

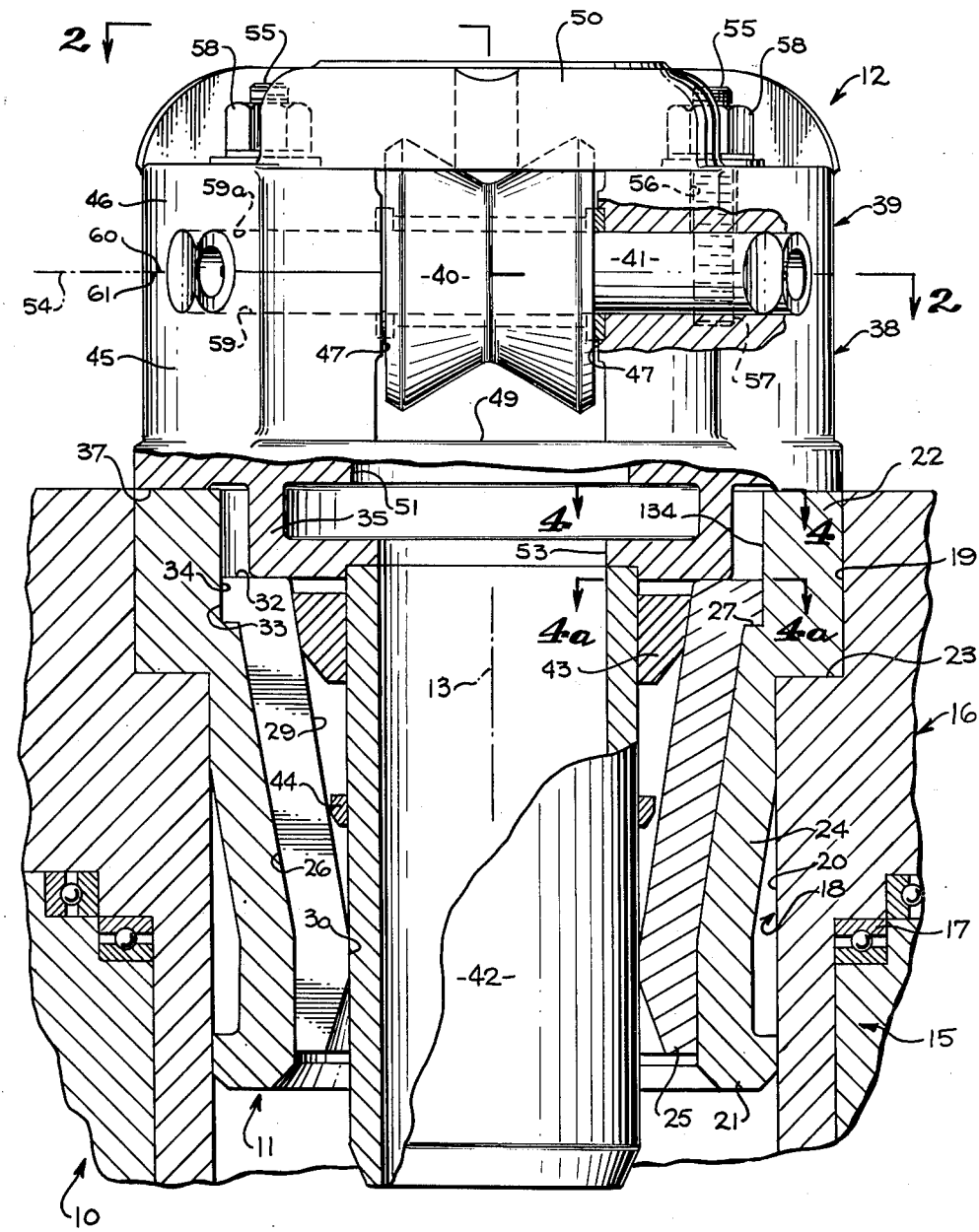

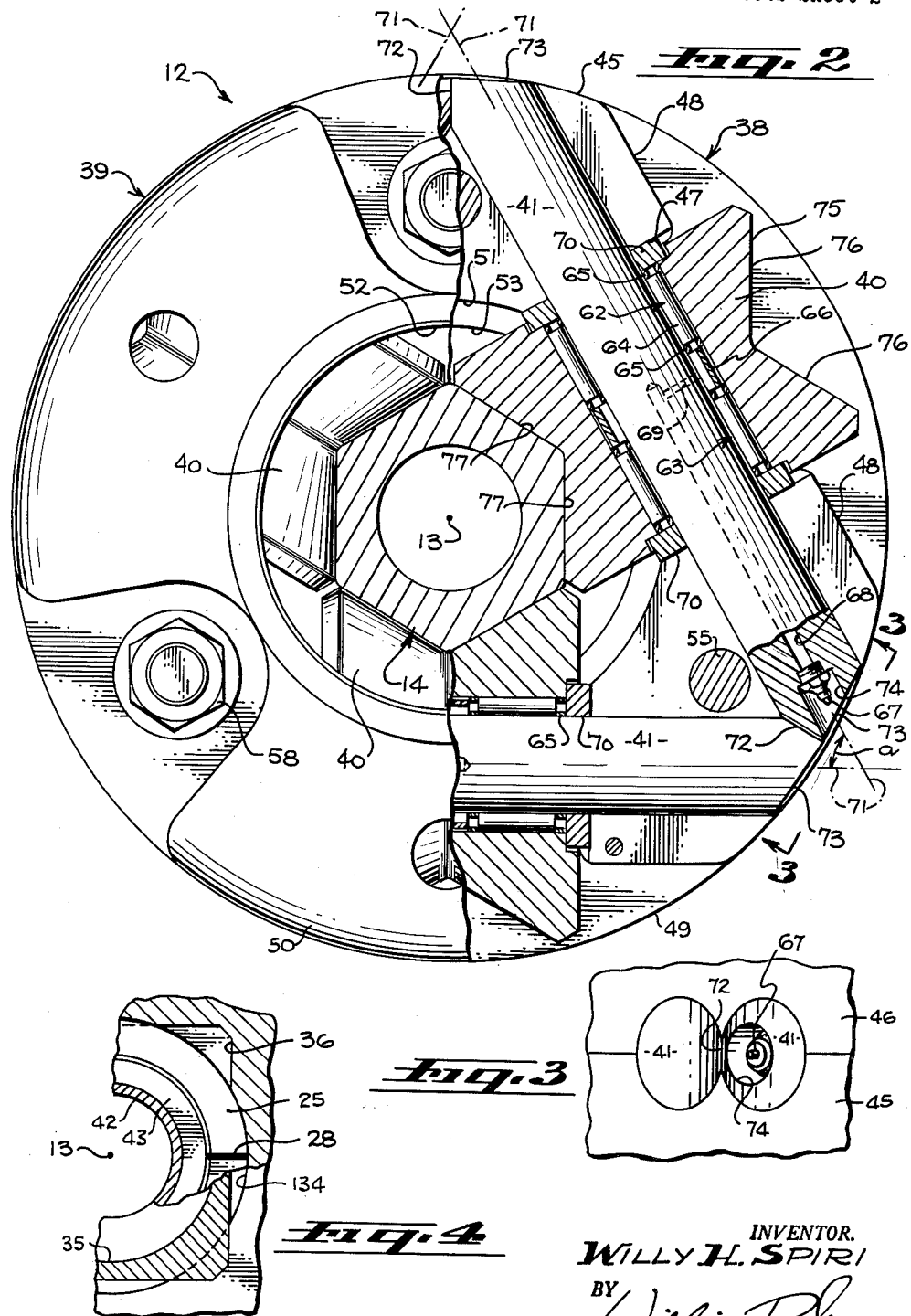

3,035,424
ROLLER DRIVE KELLY BUSHING
Willy H. Spiri, Los Angeles, Calif., assignor to Abegg & Reinhold Co., Los Angeles, Calif., a corporation of California
Filed Dec. 2, 1960, Ser. No. 73,302
10 Claims. (Cl. 64—23.7)

This invention relates to an improved type of kelly bushing, to be mounted in the rotary table of a well drilling rig, and adapted to rotatively drive a kelly in accordance with the rotation of the table.

Bushings embodying the invention are of a type in which rollers are employed for engaging and driving the kelly, to facilitate vertical movement of the kelly through the bushing. The general object of the invention is to provide certain improvements in roller type kelly bushings of this general character, with a view toward improving the manner of mounting the rollers, and their power transmission characteristics. As will appear, certain particular features of the invention are concerned especially with the provision of an optimum roller arrangement for use with a kelly whose cross section is hexagonal.

When a kelly of hexagonal cross section is being employed, I have found that optimum transmission of power through the bushing and to the kelly may be attained by the use of three evenly circularly spaced rollers in the bushing. In a bushing embodying the invention, these three rollers are desirably mounted to turn about three individual axes which lie essentially in a common horizontal plane, and which intersect one another essentially in a relation forming together an equilateral triangle centered about the main vertical axis of the bushing. About its periphery, each of the three rollers contains a groove of essentially V-shaped cross section adapted to receive and engage two of the six sides of the hexagonal kelly. Thus, the three rollers, which are preferably identical, each engage two of the six sides of the kelly, and together engage all six of the sides in a very effective and positive driving relation. The different rollers may be mounted about individual shafts, which are suitably mounted to the bushing body, with the three shafts themselves typically forming together an equilateral triangle lying in essentially a horizontal plane.

The above discussed triangular relationship between the individual axes of the three rollers, with each roller having a V-shaped groove for engaging two of the six sides of the kelly, allows for the transmission of very great rotary forces from the bushing to the kelly, with less weight being required in the bushing structure itself than has been necessary in the prior roller type bushing structures with which I am familiar. In the three roller arrangement, no roller is directly opposite either of the other two, but instead each of the rollers is offset essentially 120° from each of the other two. The different rollers take the power transmission forces equally, and no one roller or shaft need be made excessively heavy to take more than its proportionate share of the power being handled.

A further feature of the invention has to do with an improved manner of mounting the shafts of a roller type kelly bushing to the bushing body. In this connection, the invention discloses a unique way of retaining the shafts against both rotary motion and axial movement with maximum simplicity, and without the necessity for any special shaft retaining members. More particularly, the apparatus is so designed that the shafts themselves retain each other against movement relative to the bushing body. This is attained by designing one shaft to have a portion which will block an adjacent shaft against unwanted movement. For maximum simplicity the shafts may have at their opposite ends flats which extend at an angle to the individual axes of the shafts, and which abut against one another in a manner retaining the shafts against any type of movement. The body of the bushing may be formed of two sections, which are separable from one another in the plane of the shafts, and which contain complementary recesses partially receiving and confining the shafts in their assembled positions when the two sections are secured together.

The above and other features and objects of the present invention will be better understood from the following detailed description of the typical embodiment illustrated in the accompanying drawings in which:

FIG. 1 is a side view of a kelly bushing constructed in accordance with the invention, with the bushing shown in position within a rotary table and a master bushing structure, and with certain portions of the apparatus shown in vertical section;

FIG. 2 is an enlarged partially sectional view taken on line 2—2 of FIG. 1;

FIG. 3 is a fragmentary side view taken on line 3—3 of FIG. 2; and

FIG. 4 is a fragmentary horizontal section, the lower portion of which is taken on line 4—4 of FIG. 1, and the upper portion of which is broken away to the plane designated by the line 4a—4a in FIG. 1.

In the figures, there is shown fragmentarily at 10 a rotary table structure of the type conventionally used in drilling wells. Within the rotary table there is positioned a master bushing assembly generally indicated at 11, and within which there is shown a kelly bushing 12 constructed in accordance with the invention. This bushing 12 acts to transmit rotary motion about vertical axis 13 from the rotary table to a conventional kelly, which is connected to the drill string. The kelly is represented at 14 in FIG. 2, and as seen in that figure preferably has the horizontal cross section of a regular hexagon. As will be understood, the kelly is free to move vertically along axis 13 relative to the rotary table and bushing assembly as the table turns, and with the kelly being positively driven by the kelly bushing in any vertical position of the kelly.

Rotary table 10 includes a stationary portion being represented at 15 and a movable section 16 mounted by bearings 17 for powered rotation about axis 13 relative to stationary section 15. Rotatable section 16 of the rotary table contains a central vertically extending opening 18, whose upper portion 19 is of non-circular, preferably square, horizontal section, and whose lower portion 20 may be cylindrical.

The master bushing assembly 11 typically includes an outer tubular one piece part 21, having an upper externally square portion 22 received within and driven by the square recess 19 in the rotary table.

Element 21 is supported in the movable rotary table section on shoulder 23, and has a portion 24 projecting downwardly beneath this shoulder and within the lower portion 20 of rotary table opening 18. In addition to element 21, the master bushing assembly may include two complementary semi-circular slip bowl segments 25, having radially outer downwardly tapering surfaces engaging correspondingly tapered surfaces of element 21 at 26. The two slip bowl segments 25 may be of identical configuration, and be adapted when placed in part 21 to form together a composite slip bowl structure of annular configuration. The two segments 25 are supported in part 21 by interengaging shoulders on parts 21 and 25 at 27. The two semi-circular slip bowl segments 25 engage one another at two diametrically opposite locations, the engaging surfaces 28 at these locations being disposed within a vertical diametrical plane containing axis 13 (see FIG. 4).

At their radially inner sides, slip bowl segments 25 have complementary frustroconical surfaces 29, which taper downwardly to the location of a short cylindrical surface 30, downwardly beyond which the inner surfaces of segments 25 may flare outwardly as shown.

The upper horizontal surfaces 32 of slip bowl segments 25 are spaced beneath the level of the horizontal top surfaces of parts 16 and 21. The upper portions of the segments have outer cylindrical surfaces 33 engaging a corresponding cylindrical surface 34 of part 21, above the level of support shoulders 27. Upwardly beyond surfaces 32, master bushing part 21 is shaped to form an upper square portion of the opening or recess which extends vertically through part 21, which square portion receives and rotatively drives the correspondingly square portion 35 of kelly bushing 12. To form this square recess, the inner wall of part 21 (above the level of surfaces 32), extends radially outwardly beyond the diameter of surface 34 at four evenly circularly spaced locations, in a manner forming four corner recesses 36 (see FIG. 4) into which the corners or square 35 project in driving relation. Circularly between corner recesses 36, the inner wall of part 21 may form four partial cylindrical upper continuations 134 of surface 34. Above square 35, the kelly bushing body may form a horizontal shoulder 37 engaging the upper end of part 21 in a relation supporting the kelly bushing on the master bushing.

The novelty of the present invention resides in the unique manner of construction of kelly bushing 12. The rotary table and master bushing structure discussed above have been shown and described only as an illustration of the environment in which kelly bushing 12 is utilized. To now describe in detail the construction of the kelly bushing itself, this bushing includes two main body sections 38 and 39, to which there are rotatably mounted three kelly engaging rollers 40 carried by individual shafts 41. To body section 38, there may be rigidly attached a downwardly projecting centering tube 42, carrying a movable centering ring 43, both as described and claimed in detail in my Patent Number 2,904,311, issued September 15, 1959 on "Kelly Bushing Centering Means." As brought out in that patent, ring 43 is free for movement vertically relative to the pipe 42 about which it is carried, between a lower position in which ring 43 rests on a stop ring 44, and an upper position of engagement with the underside of square 35. Lower stop ring 44 is suitably welded in fixed position on pipe 42. The operation of the centering means is brought out in detail in the above identified patent, and therefore need not be elaborated upon in the present application.

Sections 38 and 39 of the kelly bushing are formed of rigid high strength material, such as a suitable steel. The lower portion of section 38 is shaped to form the drive square portion 35 of the kelly bushing, as is brought out clearly in FIG. 1, and to carry the downwardly projecting centering tube 42. Also, the downwardly facing annular shoulder 37 by which the kelly bushing is supported on the master bushing is formed on section 38 of the kelly bushing. Externally, sections 38 and 39 have cylindrical outer surfaces 45 and 46, centered about main axis 13 of the kelly bushing, and of a common diameter to form together an essentially cylindrical vertically extending body. These surfaces 45 and 46 are interrupted at the locations of the three rollers 40, to form at each of those locations two parallel generally radially extending vertical surfaces 47 between which the associated roller 40 is received. In extending from each of these surfaces 47 to the nearest portion of cylindrical surface 45 or 46, the outer surface of each section 38 and 39 has a portion 48 which is in the same vertical plane as a corresponding portion 48 at the opposite side of the roller. Beneath each roller 40, body section 38 has a portion 49 which is not interrupted at the roller location, so that the section 38 has a lower circularly continuous portion of slightly increased diameter which forms shoulder 37 at its underside.

Similarly, upper section 39 has a top portion 50 extending across the upper side of each roller 40, and suitably recessed to receive and avoid interference with the associated roller.

Internally, the two body sections 38 and 39 have circular vertically aligned openings 51 and 52, and the lower square drive portion 35 of section 38 has a similar opening 53, with all of these openings centered about main axis 13 of the device, to pass the kelly 14 vertically entirely through the bushing. The roller receiving apertures or recesses are so positioned that rollers 40 can project into the central opening of the kelly bushing, as seen in FIG. 2, for driving engagement with the kelly. The portions of body sections 38 and 39 which are located circularly between successive rollers 40 have horizontal planar surfaces which abut against one another in the horizontal plane designated at 54 in FIG. 1. These surfaces are secured in tight interengagement by three circularly spaced studs 55, which project downwardly through openings 56 in top section 39 and are threadedly connected into bottom section 38 at 57. Nuts 58, attached to the upper ends of studs 55, tighten section 39 downwardly against section 38.

Each of the rollers 40 is mounted rotatably by an individual shaft 41, which is confined between sections 38 and 39 when these sections are tightened together. More particularly, the lower half of each shaft 41 is received and confined within a horizontal upwardly facing groove or recess 59 of semi-cylindrical configuration, formed in the upper planar surface 60 of section 38. A similar downwardly facing semi-cylindrical groove or recess 59a, formed in the under surface 61 of top section 39, receives and confines the upper half of each shaft 41. These recesses 60 and 61 are provided at both sides of each roller 40, and continue outwardly to the outer cylindrical surface 45 or 46. Shafts 41 are externally cylindrical, and of the same diameter as are semi-cylindrical complementary recesses 60 and 61, to be effectively received and confined therein when the two sections 38 and 39 are secured together. The portion of each shaft 41 which is received between the two vertical surfaces 47 carries the associated roller 40, with two roller bearing assemblies 62 and 63 (FIG. 2), desirably being provided radially between the roller and shaft. Each of the assemblies 62 and 63 includes a series of circularly spaced rollers 64 retained at their opposite ends by conventional retainers 65, with the two inner retainers of the assemblies 62 and 63 being spaced apart by an annular spacer sleeve represented at 66. Grease or other lubricant is supplied to the roller bearings through a grease fitting 67 which is accessible at one end of the shaft, and which communicates through passages 68 and 69 with the space axially between roller bearing assemblies 62 and 63. Two rings 70 at opposite ends of the rollers may serve as thrust bearings, and also as grease retainers.

The three shafts 41 are so mounted that their axes 71 (FIG. 2) all lie in a common horizontal plane, and form together an equilateral triangle, having a 60° angle $a$ at each of its corners. The three shafts may all be identical, and are so designed as to retain one another against movement relative to the body sections. For this purpose, the complementary semi-cylindrical recesses 59 and 59a receiving each shaft are positioned to intersect the corresponding recesses of the adjacent shafts, at the ends of the various shafts, so that the latter may have flats 72 formed thereon and adapted to abut in a relation locking the shafts in their desired positions. The flats 72 are planar surfaces, each of which extends at an oblique angle with respect to the axis 71 of the corresponding shaft. As will be apparent, the engagement of one of the flats 72 on a first of the shafts with the corresponding flat of an adjacent shaft retains the first shaft against axial movement in one direction, and against rotation. A similar engagement of surfaces 72 at the opposite end of the same shaft retain it against axial movement in the opposite direction, and assist in preventing rotary motion also. Thus, all of the shafts are retained against rotation, or axial movement in any direction. Surfaces 73 of the shafts are desirably cut off essentially in vertical alignment with cylindrical surfaces 45 and 46 of the body sections (see FIG. 2). Into one end of each shaft 41, there extends a recess 74, within which the lubrication fitting 67 is mounted.

For engaging kelly 14, each roller 40 has an annular peripheral groove 75, of the illustrated V-shaped cross sectional configuration. This groove is centered about the axis 71 of the roller, and has its two surfaces 76 disposed at a 120° angle to one another to correspond exactly to the angularity between successive sides 77 of the hexagonal kelly. The rollers are wide enough to engage each of the surfaces 77 of the kelly across substantially its entire width (see FIG. 2), so that the kelly is gripped tightly and effectively entirely about its periphery. It will of course be apparent that the engagement between each roller surface 76 and the corresponding kelly surface 77 is a line engagement, with all of the lines of engagement of the different rollers with the kelly being in a common horizontal plane.

To now describe the manner of use of the kelly bushing, assume that the master bushing assembly 21-25 is already positioned in rotary table 10, as shown in FIG. 1, and that the kelly bushing 12 is to be inserted into the master bushing. This is effected by first positioning the kelly bushing above the opening in the rotary table, and then moving the kelly bushing downwardly to cause lower centering pipe 42 to enter the space within slip bowl segments 25. The engagement of pipe 42 with the bowl segments effects a first centering action, and upon further downward movement of the kelly bushing, ring 43 (which is then resting on ring 44, engages the slip bowl segments 25 and is deflected laterally thereby to complete the centering action, assuring positioning of the kelly bushing in exactly the right location relative to the rotary table. Upon subsequent downward movement of the kelly bushing, ring 43 is supported against further downward movement, and holds the apparatus in its centered condition while square 53 moves into the square drive recess within master bushing outer body 21. Ultimately, the kelly bushing reaches the position of FIG. 1, in which it is ready for use.

Assuming that kelly 14 is in its FIG. 2 position of extension downwardly through the kelly bushing, and is properly connected to the drill string, the rotary table is then placed in operation, to turn the master bushing assembly, and through the square 35 to turn kelly bushing 12 about axis 13. The kelly bushing itself functions to rotatively drive kelly 14, through engagement of rollers 40 with the kelly. As the kelly advances downwardly, rollers 40 are free to turn about their individual axes, to avoid any interference thereby with the movement of the kelly. The triangular relationship between the axes of the three rollers, and their mounting shafts, assures a highly effective driving action, and optimum transmission of power to the hexagonal kelly, with a minimum of weight in the overall kelly bushing structure.

I claim:

1. A kelly bushing for driving a kelly of hexagonal cross section, said bushing including a bushing body structure adapted to be removably mounted to a well drilling rotary table and to be rotatively driven thereby about a predetermined axis, three rollers for engaging and driving said kelly, and three individual shafts for mounting said rollers to said body structure for rotation relative thereto about three individual axes and at locations spaced circularly and evenly about said first mentioned axis, said three shafts having said individual axes disposed in essentially a common horizontal plane and intersecting one another essentially in a relation forming together an equilateral triangle centered about said first mentioned axis, each of said three rollers having a peripheral groove formed therein of essentially V-shaped cross section facing radially inwardly toward said first mentioned axis at a location to receive and engage two sides of said hexagonal kelly.

2. A kelly bushing as recited in claim 1, in which said body structure includes two upper and lower sections secured together and meeting at essentially the horizontal plane of said triangle formed by the three roller axes, said two body sections having complementary recesses partially receiving said shafts and confining them between the sections when the latter are secured together.

3. A kelly bushing for driving a well drilling kelly, comprising a bushing body structure adapted to be removably mounted to a rotary table and to be rotatively driven thereby about a predetermined axis, a plurality of rollers for engaging and driving said kelly, and a plurality of individual shafts carried by said body structure and mounting said rollers respectively for rotation about individual axes, one of said shafts having a portion constructed and positioned to block rotary movement of another of the shafts with the associated roller.

4. A kelly bushing for driving a well drilling kelly, comprising a bushing body structure adapted to be removably mounted to a rotary table and to be rotatively driven thereby about a predetermined axis, a plurality of rollers for engaging and driving said kelly, and a plurality of individual shafts carried by said body structure and mounting said rollers respectively for rotation about individual axes, one of said shafts having a portion constructed and positioned to block axial movement of another of the shafts.

5. A kelly bushing for driving a well drilling kelly, comprising a bushing body structure adapted to be removably mounted to a rotary table and to be rotatively driven thereby about a predetermined axis, a plurality of rollers for engaging and driving said kelly, and a plurality of individual shafts carried by said body structure and mounting said rollers respectively for rotation about individual axes, two of said shafts having portions extending into engagement with one another, and constructed to retain both of said shafts against both axial movement and rotation about said individual roller axes.

6. A kelly bushing for driving a well drilling kelly, comprising a bushing body structure adapted to be removably mounted to a rotary table and to be rotatively driven thereby about a predetermined axis, a plurality of rollers for engaging and driving said kelly, and a plurality of individual shafts carried by said body structure and mounting said rollers respectively for rotation about individual axes, two of said shafts having end portions with flats formed thereon disposed at an oblique angle to the axes of their respective shafts and engaging one another in a relation retaining both of said two shafts against both axial movement and rotation with the rollers.

7. A kelly bushing for driving a well drilling kelly, comprising a bushing body structure adapted to be removably mounted to a rotary table and to be rotatively driven thereby about a predetermined axis, a plurality of rollers for engaging and driving said kelly, and a plurality of individual shafts carried by said body structure and mounting said rollers respectively for rotation about individual axes, one of said shafts having a portion constructed and positioned to block rotary movement of another of the shafts with the associated roller, said body structure including two upper and lower sections secured together and meeting at the location of said shafts, said two sections having complementary recesses partially receiving said shafts and confining them between the sections when the latter are secured together.

8. A kelly bushing for driving a kelly of hexagonal cross section, said bushing including a body structure adapted to be removably mounted to a well drilling rotary table and to be rotatively driven thereby about a predetermined axis, three rollers for engaging and driving said kelly, and three individual shafts mounting said rollers to said body structure for rotation relative thereto about three individual axes and at locations spaced circularly and evenly about said first mentioned axis, each of said three rollers having a peripheral groove formed therein of essentially V-shaped cross section facing radially inwardly toward said first mentioned axis at a location to receive and engage two sides of said hexagonal kelly, successive ones of said shafts having end portions coming essentially together and constructed to block one another against rotation about said individual roller axes.

9. A kelly bushing for driving a kelly of hexagonal cross section, said bushing including a body structure adapted to be removably mounted to a well drilling rotary table and to be rotatively driven thereby about a predetermined axis, three rollers for engaging and driving said kelly, and three individual shafts mounting said rollers to said body structure for rotation relative thereto about three individual axes and at locations spaced circularly and evenly about said first mentioned axis, each of said three rollers having a peripheral groove formed therein of essentially V-shaped cross section facing radially inwardly toward said first mentioned axis at a location to receive and engage two sides of said hexagonal kelly, successive ones of said shafts having end portions coming essentially together and constructed to block one another against axial movement.

10. A kelly bushing for driving a kelly of hexagonal cross section, said bushing including a body structure adapted to be removably mounted to a well drilling rotary table and to be rotatively driven thereby about a predetermined axis, three rollers for engaging and driving said kelly, and three individual shafts mounting said rollers to said body structure for rotation relative thereto about three individual axes and at locations spaced circularly and evenly about said first mentioned axis, each of said three rollers having a peripheral groove formed therein of essentially V-shaped cross section facing radially inwardly toward said first mentioned axis at a location to receive and engage two sides of said hexagonal kelly, said body structure including two upper and lower sections secured together and meeting at essentially the horizontal plane of said three roller axes, said two body sections having complementary semi-circular recesses partially receiving said shafts and confining them between the sections when the latter are secured together, said shafts having end portions with flats formed thereon at an oblique angle to their respective axes and interengaging in a relation retaining all of the shafts against both axial movement and rotation about said individual roller axes.

References Cited in the file of this patent

UNITED STATES PATENTS

| | | |
|---|---|---|
| 672,613 | Carter | Apr. 23, 1901 |
| 1,449,647 | Boykin | Mar. 27, 1923 |
| 2,202,446 | Esseling | May 28, 1940 |
| 2,904,311 | Spiri | Sept. 15, 1959 |